United States Patent
Cho et al.

(10) Patent No.: US 8,395,909 B2
(45) Date of Patent: Mar. 12, 2013

(54) DISPLAY MODULE

(75) Inventors: Chin-Hsing Cho, Yunlin County (TW); Tsao-Yuan Fu, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 357 days.

(21) Appl. No.: 12/688,904

(22) Filed: Jan. 17, 2010

(65) Prior Publication Data

US 2011/0110069 A1 May 12, 2011

(30) Foreign Application Priority Data

Nov. 12, 2009 (TW) .............................. 98221004 U

(51) Int. Cl.
*H02B 1/01* (2006.01)
(52) U.S. Cl. .............. 361/829; 361/679.01; 361/679.02; 361/679.21; 313/46; 313/504; 313/582; 349/58; 349/60; 349/62
(58) Field of Classification Search .................. 361/829, 361/679.01, 679.02, 679.21; 313/46, 504, 313/582; 349/58, 60, 62
See application file for complete search history.

(56) References Cited

U.S. PATENT DOCUMENTS

| | | | | |
|---|---|---|---|---|
| 5,176,352 A | * | 1/1993 | Braun | 248/346.01 |
| 5,808,707 A | * | 9/1998 | Niibori et al. | 349/60 |
| 6,031,524 A | * | 2/2000 | Kunert | 345/173 |
| 7,145,766 B2 | * | 12/2006 | Homer et al. | 361/679.17 |
| 2001/0000763 A1 | * | 5/2001 | Muramatsu | 439/74 |
| 2004/0119410 A1 | * | 6/2004 | Jun et al. | 313/582 |
| 2005/0185110 A1 | * | 8/2005 | Lai et al. | 349/58 |
| 2006/0066772 A1 | * | 3/2006 | Takahashi et al. | 349/60 |
| 2006/0140438 A1 | * | 6/2006 | Kimura et al. | 381/431 |
| 2006/0146224 A1 | * | 7/2006 | Lee et al. | 349/58 |
| 2007/0139580 A1 | * | 6/2007 | Zhang | 349/58 |
| 2007/0152553 A1 | * | 7/2007 | Jun et al. | 313/46 |
| 2007/0252922 A1 | * | 11/2007 | Oohira | 349/58 |
| 2008/0170174 A1 | * | 7/2008 | Nishiyama | 349/62 |
| 2008/0252811 A1 | * | 10/2008 | Shang | 349/60 |
| 2008/0315766 A1 | * | 12/2008 | Jun et al. | 313/582 |
| 2009/0138695 A1 | * | 5/2009 | Jung et al. | 713/2 |
| 2009/0167171 A1 | * | 7/2009 | Jung et al. | 313/504 |
| 2009/0168314 A1 | * | 7/2009 | Park et al. | 361/679.02 |
| 2010/0067726 A1 | * | 3/2010 | Suzuki et al. | 381/333 |
| 2011/0019351 A1 | * | 1/2011 | Bayne et al. | 361/679.01 |
| 2011/0310545 A1 | * | 12/2011 | Liu | 361/679.01 |

* cited by examiner

*Primary Examiner* — Xiaoliang Chen

(74) *Attorney, Agent, or Firm* — Winston Hsu; Scott Margo

(57) ABSTRACT

A display module includes a display panel, an external frame, and a pad structure. The external frame is disposed at a side of the display panel. The pad structure is disposed between the display panel and the external frame. A panel-absorbing portion is formed on a surface of the pad structure facing the display panel. The panel-absorbing portion is used for absorbing the display panel so as to fix the pad structure on the display panel.

10 Claims, 5 Drawing Sheets

DISPLAY MODULE

BACKGROUND OF THE INVENTION

1. Field of the Invention

The present invention relates to a display module, and more specifically, to a display module utilizing a hollow absorbing structure to fix a pad structure on a display panel or an external frame.

2. Description of the Prior Art

In general, during an assembly process of an LCD (Liquid Crystal Display) screen, a buffer structure is usually disposed between a display panel and an external frame which is used for containing related components of a backlight module. The buffer structure is usually made of flexible material, such as silicone rubber material, Poron material, and Polypropylene material. In such a manner, the buffer structure may not only provide an impact-absorbing function and a skidproof function to the display panel, but may also prevent foreign objects from entering a light-mixing chamber of the backlight module so as to avoid dark spots appearing on a display image.

A conventional method for fixing the said buffer structure involves utilizing twin adhesive tapes to stick the buffer structure to the external frame and then disposing the display panel on the external frame. However, since environment temperature changes may cause structural variations of the buffer structure, a wrinkled surface usually appears on the buffer structure so that the twin adhesive tapes may therefore fall off the external frame easily. In addition, since the adhesive on the twin adhesive tapes may be solidified in a cold environment, dark spots may appear easily when the solidified adhesive falling off the external frame enters the light-mixing chamber of the backlight module.

Furthermore, the said method may not only need to be performed manually so as to cause a time-consuming and strenuous assembly process, but may also make repetitive assembly of the LCD screen difficult due to the adhesive property of the twin adhesive tapes.

SUMMARY OF THE INVENTION

The present invention provides a display module comprising:

a display panel; an external frame disposed at a side of the display panel; and a pad structure disposed between the display panel and the external frame, a panel-absorbing portion being formed on a surface of the pad structure facing the display panel for absorbing the display panel so as to fix the pad structure on the display panel.

The present invention further provides a display module comprising a display panel; an external frame disposed at a side of the display panel; and a pad structure disposed between the display panel and the external frame, a frame-absorbing portion being formed on a surface of the pad structure facing the external frame for absorbing the external frame so as to fix the pad structure on the external frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . . "

Figure 1:
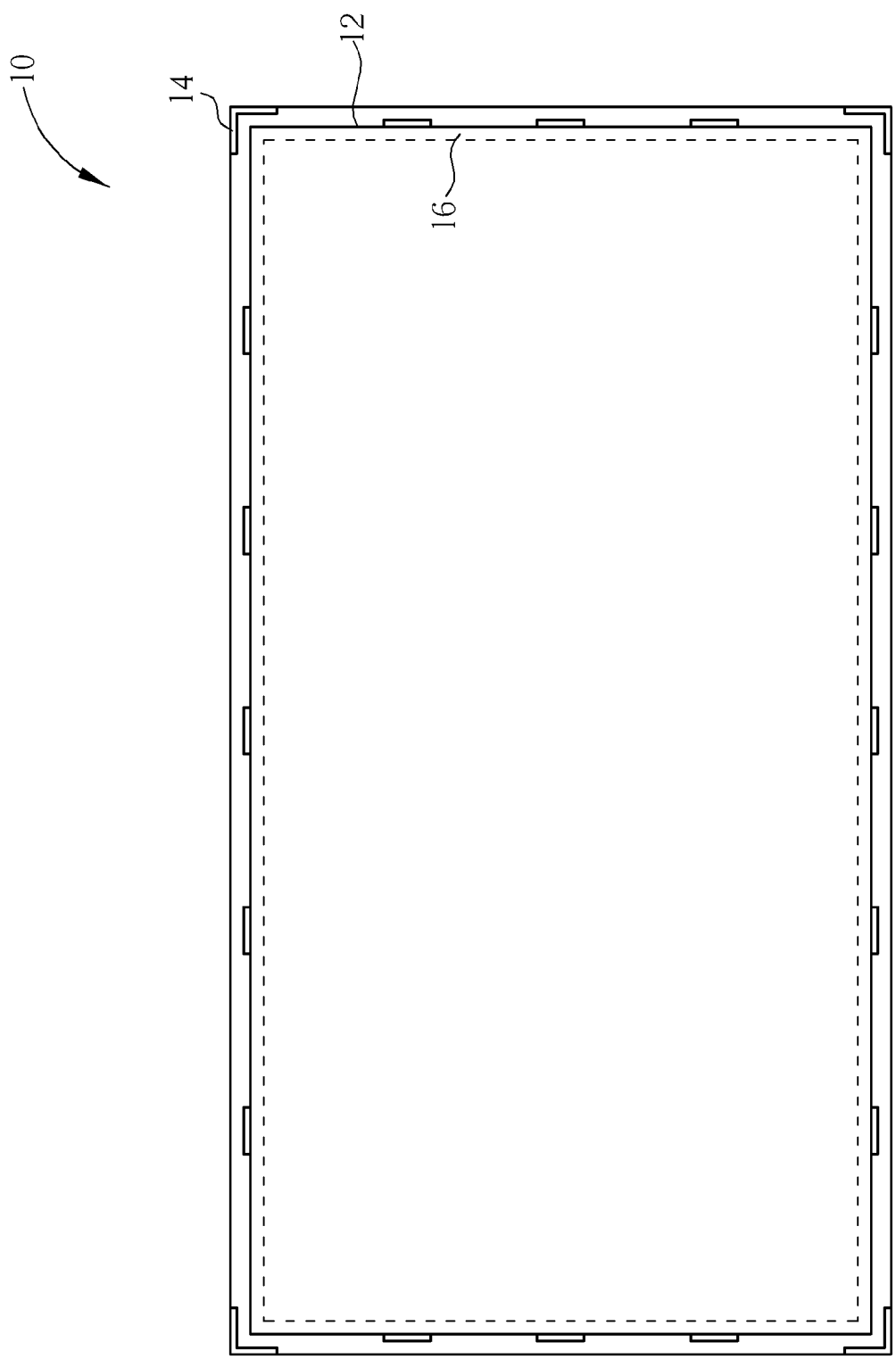
FIG. 1 is an assembly diagram of a display module according to a preferred embodiment of the present invention.

Please refer to FIG. 1, which is an assembly diagram of a display module 10 according to a preferred embodiment of the present invention. The display module 10 includes a display panel 12, an external frame 14, and a pad structure 16. As shown in FIG. 1, the external frame 14 is disposed at a bottom end of the display panel 12 for containing related components of a backlight module, such as a backlight source and a light guide board. The pad structure 16 (depicted by a dotted line in FIG. 1) is disposed between the display panel 12 and the external frame 14. In this embodiment, the pad structure 16 is preferably a ring-shaped pad and is disposed around the external frame 14. The pad structure 16 is preferably made of flexible material, such as silicone rubber material, for providing an impact-absorbing function to the display panel 12.

Figure 2:
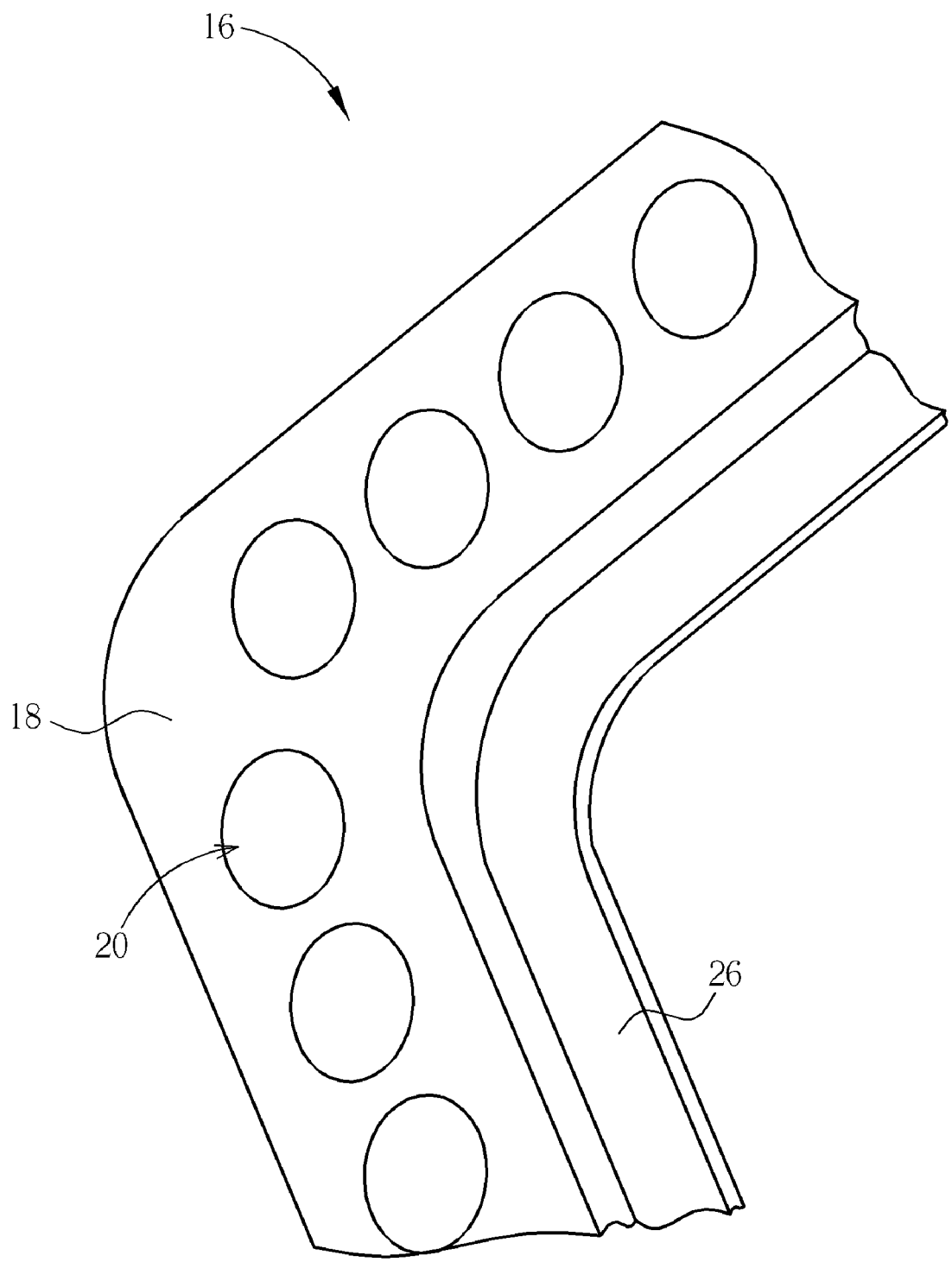
FIG. 2 is a partial enlarged diagram of a pad structure in FIG. 1.
Figure 3:
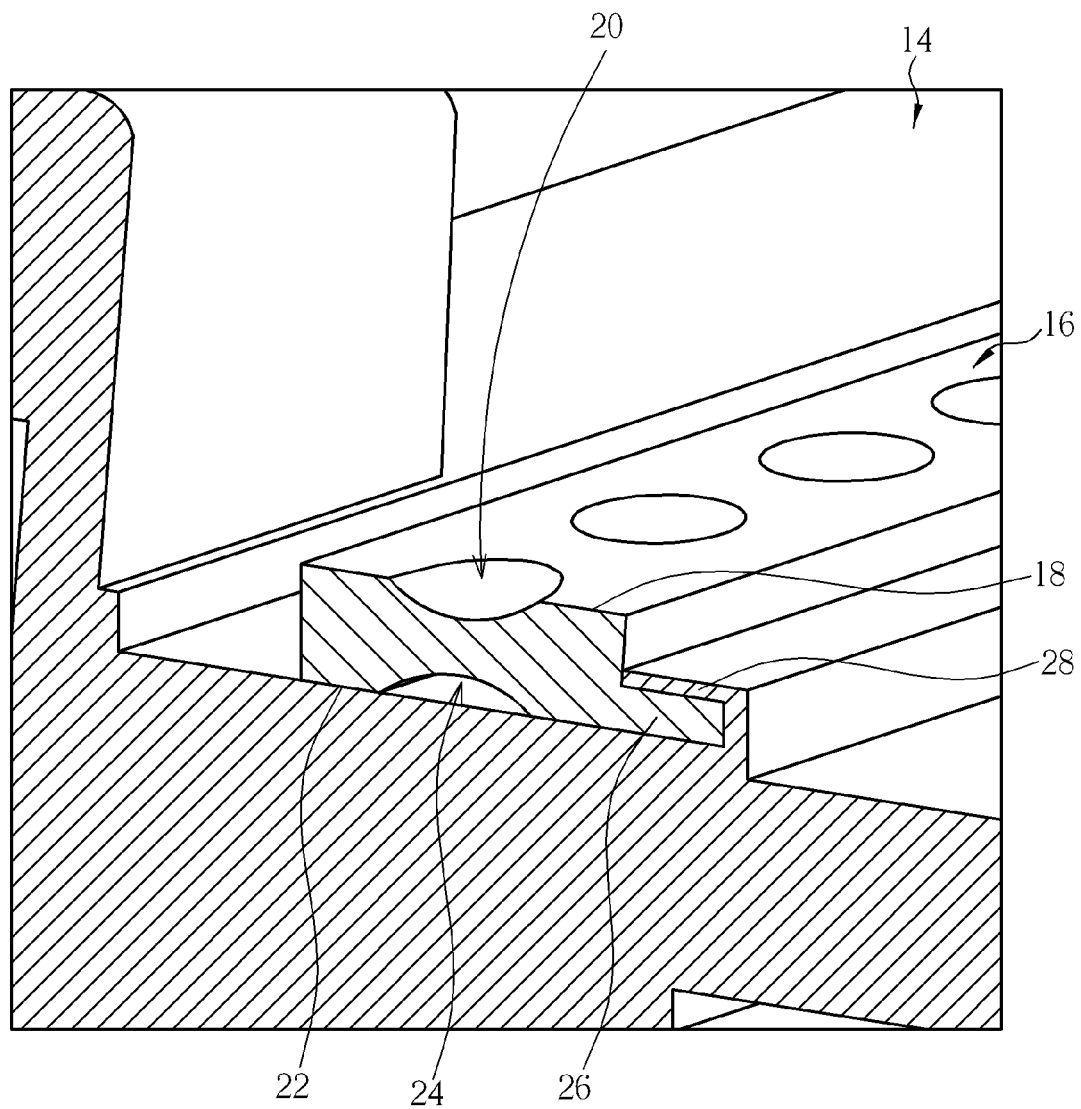
FIG. 3 is a partial cross-sectional diagram of the pad structure in FIG. 2 being disposed on an external frame.

Next, please refer to FIG. 1, FIG. 2, and FIG. 3. FIG. 2 is a partial enlarged diagram of the pad structure 16 in FIG. 1. FIG. 3 is a partial cross-sectional diagram of the pad structure 16 in FIG. 2 being disposed on the external frame 14. As shown in FIG. 1 and FIG. 3, at least one panel-absorbing portion 20 is formed on a first surface 18 of the pad structure 16 facing the display panel 12 and at least one frame-absorbing portion 24 is formed on a second surface 22 of the pad structure 16 facing the external frame 14. The panel-absorbing portion 20 and the frame-absorbing portion 24 are used for absorbing the display panel 12 and the external frame 14 respectively so as to fix the display panel 12 on the external frame 14. The related absorbing principle is described in detail as follows. When the pad structure 16 is sandwiched by the display panel 12 and the external frame 14 tightly, air may be extruded from the panel-absorbing portion 20 and the frame-absorbing portion 24 so that the panel-absorbing portion 20 and the frame-absorbing portion 24 may be in a nearly-vacuum state. Thus, the panel-absorbing portion 20 and the frame-absorbing portion 24 may provide absorbing force to the display panel 12, and the external frame 14 respectively, so that the pad structure 16 may be absorbed onto the display panel 12 and the external frame 14 firmly.

In this embodiment, the panel-absorbing portion 20 and the frame-absorbing portion 24 are preferably a circular recessed structure, but are not limited thereto. That is, the panel-absorbing portion 20 and the frame-absorbing portion 24 may also be other recessed structure capable of generating absorbing force, such as an ellipse-shaped recessed structure. As for number of the panel-absorbing portion 20 and the frame-absorbing portion 24, it depends on assembly needs of the display module 10. Furthermore, as shown in FIG. 2 and FIG. 3, an extended part 26 is formed at a side of the pad structure 16, and a slot structure 28 is correspondingly formed on the external frame 14. The extended part 26 is used for engaging with the slot structure 28 (as shown in FIG. 3) so as to fix the pad structure 16 on the external frame 14.

Figure 4:
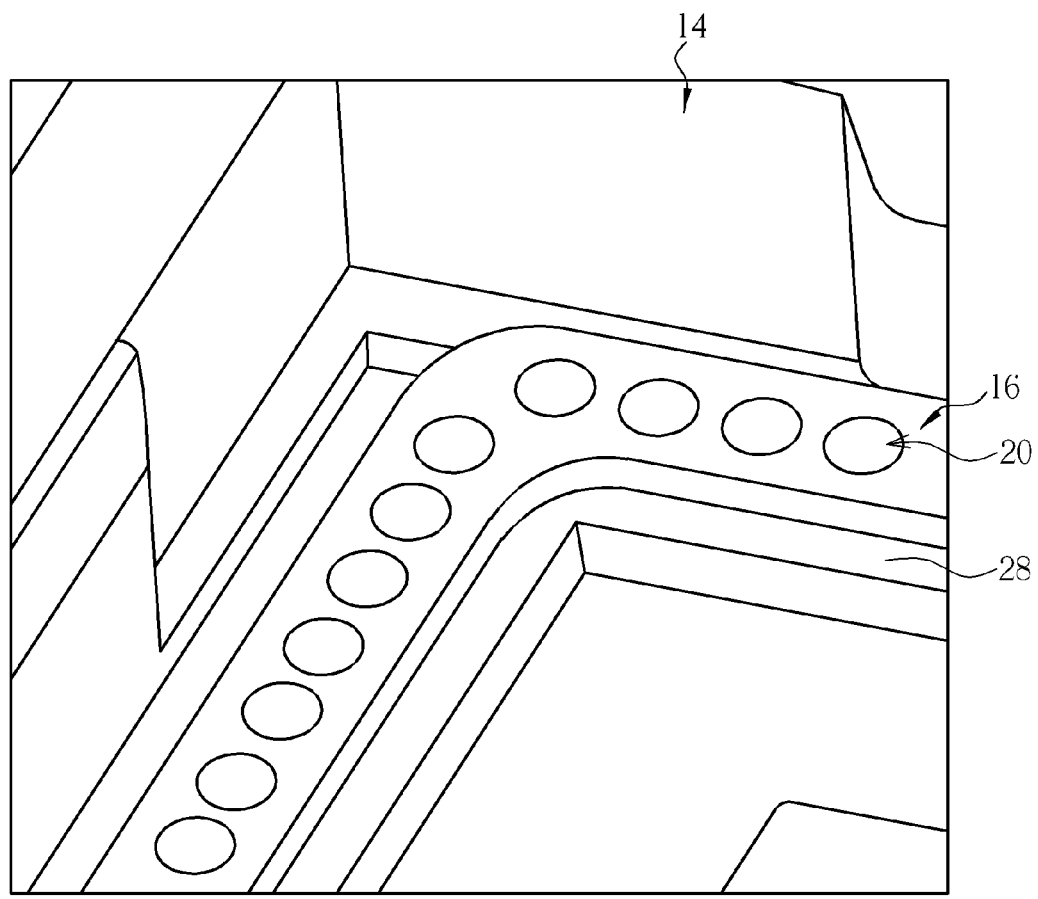
FIG. 4 is a partial enlarged diagram of the pad structure in FIG. 2 being disposed on the external frame.

More detailed description for assembly of the display module 10 is provided as follows. Please refer to FIG. 2, FIG. 3, and FIG. 4. FIG. 4 is a partial enlarged diagram of the pad structure 16 in FIG. 2 being disposed on the external frame 14. The first step is to insert the extended part 26 of the pad structure 16 into the slot structure 28 of the external frame 14. In such a manner, the pad structure 16 may be disposed on the external frame 14 firmly via engagement of the extended part 26 and the slot structure 28 (as shown in FIG. 3). In addition, as shown in FIG. 3, the pad structure 16 can also be absorbed onto the external frame 14 by the frame-absorbing portion 24 on the second surface 22. In such a manner, the pad structure 16 may be fixed on the external frame 14 more firmly. The method for absorbing the frame-absorbing portion 24 onto the external frame 14 involves extruding air from the frame-absorbing portion 24 manually or utilizing the weight of the display panel 12 to press the pad structure 16 so as to extrude air from the frame-absorbing portion 24.

After finishing assembly of the pad structure 16 and the external frame 14, the next step is to dispose the display panel 12 on the pad structure 16. At this time, the display panel 12 may utilize its weight to press the pad structure 16 so that air may be extruded from the panel-absorbing portion 20 accordingly. Thus, the pad structure 16 may be absorbed onto the display panel 12 by absorbing force generated by the panel-absorbing portion 20 as shown in FIG. 3, so as to finish assembly of the display panel 12 and the pad structure 16 (as shown in FIG. 1). Furthermore, the assembly sequence of the display module 10 is not limited to the said embodiment. For example, assembly of the pad structure 16 and the display panel 12 may also be finished first before disposing the display panel 12 on the external frame 14. As for which assembly sequence is utilized, it depends on assembly needs of the display module 10.

In summary, the display module 10 may constrain motion of the display panel 12 relative to the external frame 14 via disposal of the pad structure 16 between the display panel 12 and the external frame 14, vacuum absorption of the panel-absorbing portion 20 onto the display panel 12, vacuum absorption of the frame-absorbing portion 24 onto the external frame 14, and engagement of the extended part 26 and the slot structure 28. Thus, when the display module 10 receives external impact, damage of the display panel 12 caused by collision with the external frame 14 may be prevented accordingly.

Figure 5:
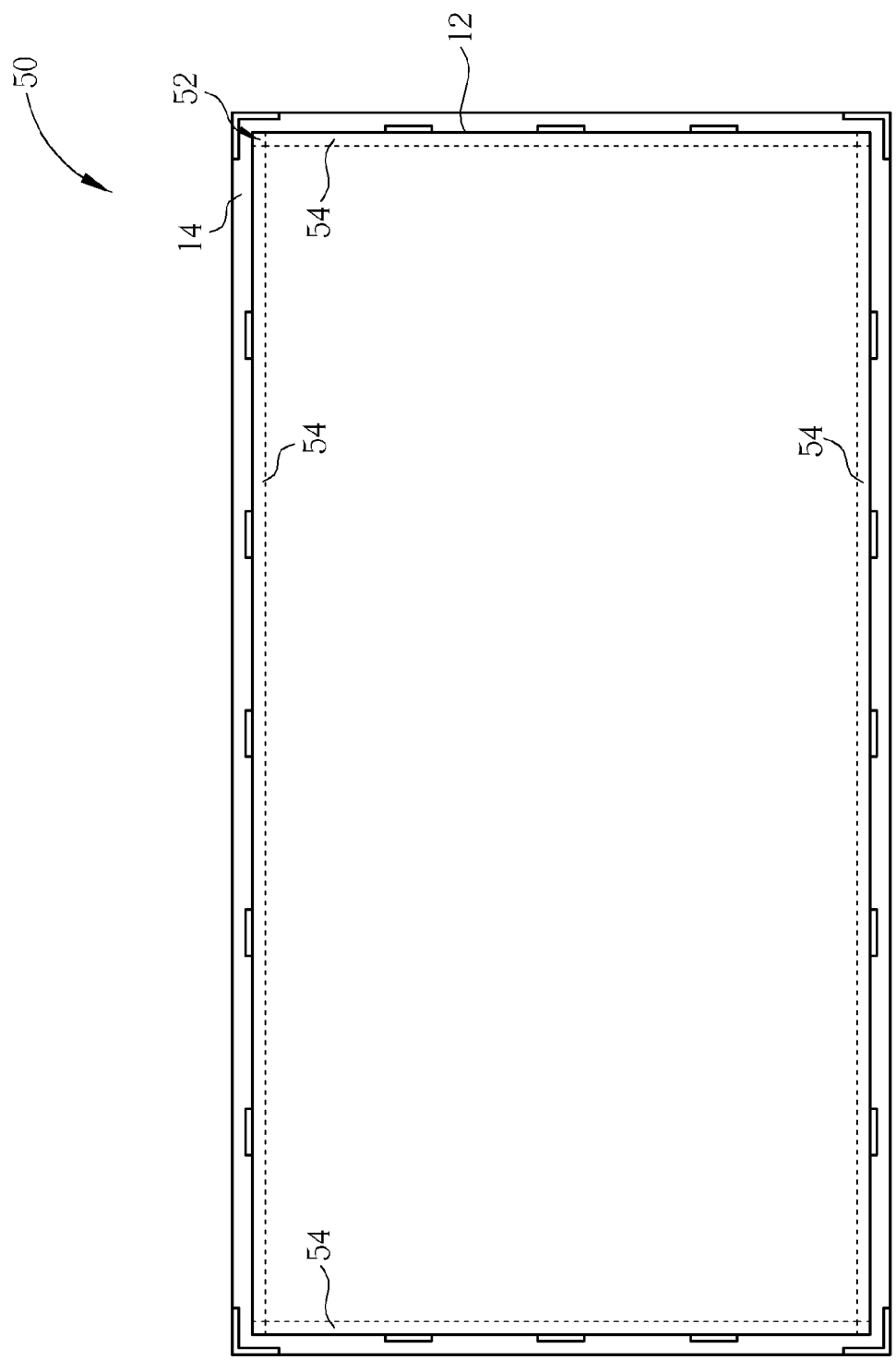
FIG. 5 is an assembly diagram of a display module according to another preferred embodiment of the present invention.

It should be noted that the structural design of the pad structure 16 is not limited to that mentioned in the said embodiment. For example, please refer to FIG. 5, which is an assembly diagram of a display module 50 according to another preferred embodiment of the present invention. Components both mentioned in the two embodiments represent similar functions or positions, and the related description is therefore omitted herein. A difference between the display module 50 and the display module 10 is the structural design of the pad structure. As shown in FIG. 5, the display module 50 includes a display panel 12, the external frame 14, and a pad structure 52. Compared with the pad structure 16 which is a ring-shaped pad, the pad structure 52 includes a plurality of pads 54 (four shown in FIG. 5) which are discontinuously disposed around the external frame 14. The structural designs mentioned in the said embodiment may be applied to each pad 54. For example, an extended part may be formed at a side of each pad 54 for engaging with a corresponding slot structure on the external frame 14. The related assembly process of the display module 50 may be reasoned by analogy according to the said embodiment, and it is therefore omitted herein. In such a manner, via the configuration of the plurality of pads 54 being discontinuously disposed around the external frame 14, not only the material cost of the display module 50 may be reduced, but the structural design of the display module 50 may also be simplified.

Furthermore, in the present invention, the absorbing portions on the pad structure and the extended part mentioned in the said embodiments may be an omissible structure. For example, the pad structure may only have frame-absorbing portions formed on its surface facing the external frame. In such a manner, during the assembly process of the display module, the pad structure may be fixed on the external frame only by absorbing force provided from the frame-absorbing portions without the extended part. As for fixing of the display panel on the pad structure, it may just utilize friction force between the pad structure and the display panel to constrain motion of the display panel relative to the external frame. Other related structural variations may be reasoned by analogy. For example, the pad structure may only have the panel-absorbing portions formed on its surface facing the display panel, or only the extended part may be omitted from the pad structure.

Compared with the prior art, in which a buffer structure is stuck to an external frame of a display module by twin adhesive tapes, the present invention involves utilizing the absorbing portions formed on the pad structure to absorb onto the external frame and the display panel instead, so as to omit the manual sticking step. In such a manner, the present invention may not only prevent foreign objects from entering a light mixing chamber of a backlight module and constrain motion of the display panel relative to the external frame via disposal of the pad structure between the external frame and the display panel, but may also solve the said problem of dark spots appearing on a display image caused by solidified adhesives. Furthermore, since there is no need to use the twin adhesive tapes, the related manufacturing cost of the display module may be reduced and the purpose of repetitive assembly of the display module may be achieved.

Those skilled in the art will readily observe that numerous modifications and alterations of the device and method may be made while retaining the teachings of the invention.

What is claimed is:

1. A display module comprising:
    a display panel;
    an external frame disposed at a side of the display panel; and
    a pad structure disposed between the display panel and the external frame, a panel-absorbing portion being formed on a surface of the pad structure facing the display panel, a hollow space of the panel-absorbing portion being isolated from an ambient atmosphere outside the pad structure when the pad structure is sandwiched by the display panel and the external frame, so that the panel-absorbing portion is absorbed onto the display panel when air is extruded from the hollow space of the panel-absorbing portion to make the hollow space of the panel-absorbing portion be in a nearly-vacuum state, for fixing the pad structure on the display panel.

2. The display module of claim 1, wherein an extended part is formed at a side of the pad structure, a slot structure is formed on the external frame corresponding to the extended part, and the extended part is used for engaging with the slot structure so as to fix the pad structure on the external frame.

3. The display module of claim 1, wherein the pad structure is a ring-shaped pad disposed around the external frame.

4. The display module of claim 1, wherein the pad structure comprises a plurality of pads, and the plurality of pads is discontinuously disposed around the external frame.

5. The display module of claim 4, wherein an extended part is formed at a side of each pad respectively, a slot structure is formed on the external frame corresponding to the extended part, and each extended part is used for engaging with the corresponding slot structure so as to fix the corresponding pad on the external frame.

6. The display module of claim 1, wherein the panel-absorbing portion is a circular recessed structure.

7. The display module of claim 1, wherein a frame-absorbing portion is formed on a surface of the pad structure facing the external frame, and a hollow space of the frame-absorbing portion is isolated from the ambient atmosphere outside the pad structure when the pad structure is sandwiched by the display panel and the external frame so that the frame-absorbing portion is absorbed onto the external frame when air is extruded from the hollow space of the frame-absorbing portion to make the hollow space of the frame-absorbing portion be in a nearly-vacuum state, for fixing the pad structure on the external frame.

8. The display module of claim 7, wherein the frame-absorbing portion is a circular recessed structure.

9. The display module of claim 1, wherein the pad structure is made of flexible material.

10. The display module of claim 9, wherein the pad structure is made of silicone rubber material.

\* \* \* \* \*